US012565999B2

(12) United States Patent
Singh et al.

(10) Patent No.: US 12,565,999 B2
(45) Date of Patent: Mar. 3, 2026

(54) SYSTEM AND METHOD FOR CONTROLLING A HEATING DEVICE

(71) Applicants: Uday Singh, Stewartsville, NJ (US); Tejas Singh, Boston, MA (US); Santhosh Xavier, Robbinsville, NJ (US); Neha Singh, Brookly, NY (US); Shrey Mathur, Aurora, IL (US); Anirudh Kotte, Secunderabad (IN); Renu Kasarla, Philadelphia, PA (US)

(72) Inventors: Uday Singh, Stewartsville, NJ (US); Tejas Singh, Boston, MA (US); Santhosh Xavier, Robbinsville, NJ (US); Neha Singh, Brookly, NY (US); Shrey Mathur, Aurora, IL (US); Anirudh Kotte, Secunderabad (IN); Renu Kasarla, Philadelphia, PA (US)

(*) Notice: Subject to any disclaimer, the term of this patent is extended or adjusted under 35 U.S.C. 154(b) by 510 days.

(21) Appl. No.: 18/087,838

(22) Filed: Dec. 23, 2022

(65) Prior Publication Data

US 2024/0210040 A1 Jun. 27, 2024

(51) Int. Cl.

| | |
|---|---|
| ***F24C 3/12*** | (2006.01) |
| ***F24C 7/08*** | (2006.01) |
| ***F24C 15/20*** | (2006.01) |
| *F27D 21/02* | (2006.01) |

(52) U.S. Cl.

CPC .............. *F24C 3/126* (2013.01); *F24C 3/128* (2013.01); *F24C 7/087* (2013.01); *F24C 15/2042* (2013.01); *F24C 3/124* (2013.01); *F24C 7/085* (2013.01); *F27D 2021/026* (2013.01)

(58) Field of Classification Search

CPC .... F24C 15/2042; F24C 15/105; F24C 7/081; F24C 7/083; F24C 7/085; F24C 7/087; F24C 3/122; F24C 3/124; F24C 3/126; F24C 3/128; F27D 2021/026

See application file for complete search history.

(56) References Cited

U.S. PATENT DOCUMENTS

| | | | | |
|---|---|---|---|---|
| 12,198,520 | B2 * | 1/2025 | Andronescu | G06V 20/68 |
| 2021/0137310 | A1 * | 5/2021 | Shim | G06N 3/04 |
| 2021/0251263 | A1 * | 8/2021 | Knighton | A23L 5/10 |
| 2022/0273139 | A1 * | 9/2022 | Mahapatra | G05B 13/0265 |

FOREIGN PATENT DOCUMENTS

| | | | | |
|---|---|---|---|---|
| CN | 113129890 A | * | 7/2021 | A47J 31/00 |
| CN | 114190760 A | * | 3/2022 | A47J 37/0629 |
| KR | 20190001131 A | * | 1/2019 | H04N 23/57 |
| WO | WO-2023017645 A1 | * | 2/2023 | G10L 15/22 |

* cited by examiner

*Primary Examiner* — Reginald Alexander

(57) ABSTRACT

A system for controlling a heating device by monitoring the status of any dish being cooked. The system is provided with connectivity to cloud server comprising the relevant reference data, one or more sensors configured to monitor the status of dish being cooked, and processing circuitry that prevents the dish from being overcooked, burned, or spilled over by using the combination of reference data that is stored on the cloud server as well as the sensory data from one or more of its sensors, and generating a warning signal to the user. Additionally, the system and its one or more sensors will monitor the surroundings for hazardous conditions such as cooking gas leakages, active heating device left unattended for a long time.

16 Claims, 7 Drawing Sheets

SYSTEM AND METHOD FOR CONTROLLING A HEATING DEVICE

TECHNICAL FIELD

The present invention relates to a system and a method for controlling a heating device by monitoring a dish that is being cooked, shutting off the heating device when the system detects that the dish is done cooking, and raising an alarm when an unsafe situation arises in and around the heating device.

BACKGROUND

Some people love cooking while most love eating, however, no one possibly likes cleaning. Having to clean up the stove or heating devices after cooking, because of food spilled over during the cooking session, is one of the most frustrating things in life. Additionally, split or overcooked, or burnt food, adds to the list of perfectly avoidable waste. Another issue most frequently faced in the kitchens is forgetfulness with regards to turning off the stove or heating device such as a valve of a gas stove before leaving a kitchen or a house. This sometimes may become a reason for accidents due to the cooking gas. Sometimes, similar incidents may occur because of undetected gas leakage as well. This may cause commercial damage and even lead to personal injury.

Therefore, there is a need for a system and a method for controlling a heating device by continuously monitoring the cooking dish. Further, there is a need for a system that may monitor the status of the heating device, detect cooking gas leakage, and control the heating device.

SUMMARY

The present disclosure discloses a system and a method for controlling a heating device by continuously monitoring a cooking dish being prepared in/on the heating device. The first aspect of the present disclosure relates to a system for controlling a heating device by monitoring a cooking dish. The system, according to the first aspect, is provided with a cloud server, one or more sensors, and processing circuitry. The cloud server comprises reference data. One or more sensors are configured to monitor the cooking dish and the heating device. The processing circuitry is communicatively coupled with the cloud server and one or more sensors. The processing circuitry is configured to receive sensory data from one or more sensors, determine the closeness of the cooking dish from being overcooked, burned, or spilled over using the received sensory data, and generate a warning signal for a user based on the determined closeness of the cooking dish from being overcooked, burned, or spilled over.

The processing circuitry is further configured to receive a user input corresponding to the acknowledgment of the warning signal from the user, or activate an alerting device to alert the user when not received the user input. The processing circuitry is further configured to determine the closeness of the cooking dish from being cooked, overcooked, burned, or spilled over, activate the alerting device based on the determined closeness, and generate a signal to control the heating device based on the determined closeness and status of the alerting device.

According to an embodiment, the system further comprises a wireless communication module to connect with a user device to send a warning signal to the user device and receive the user input and control command from the user.

DETAILED DESCRIPTION

Figure 1:
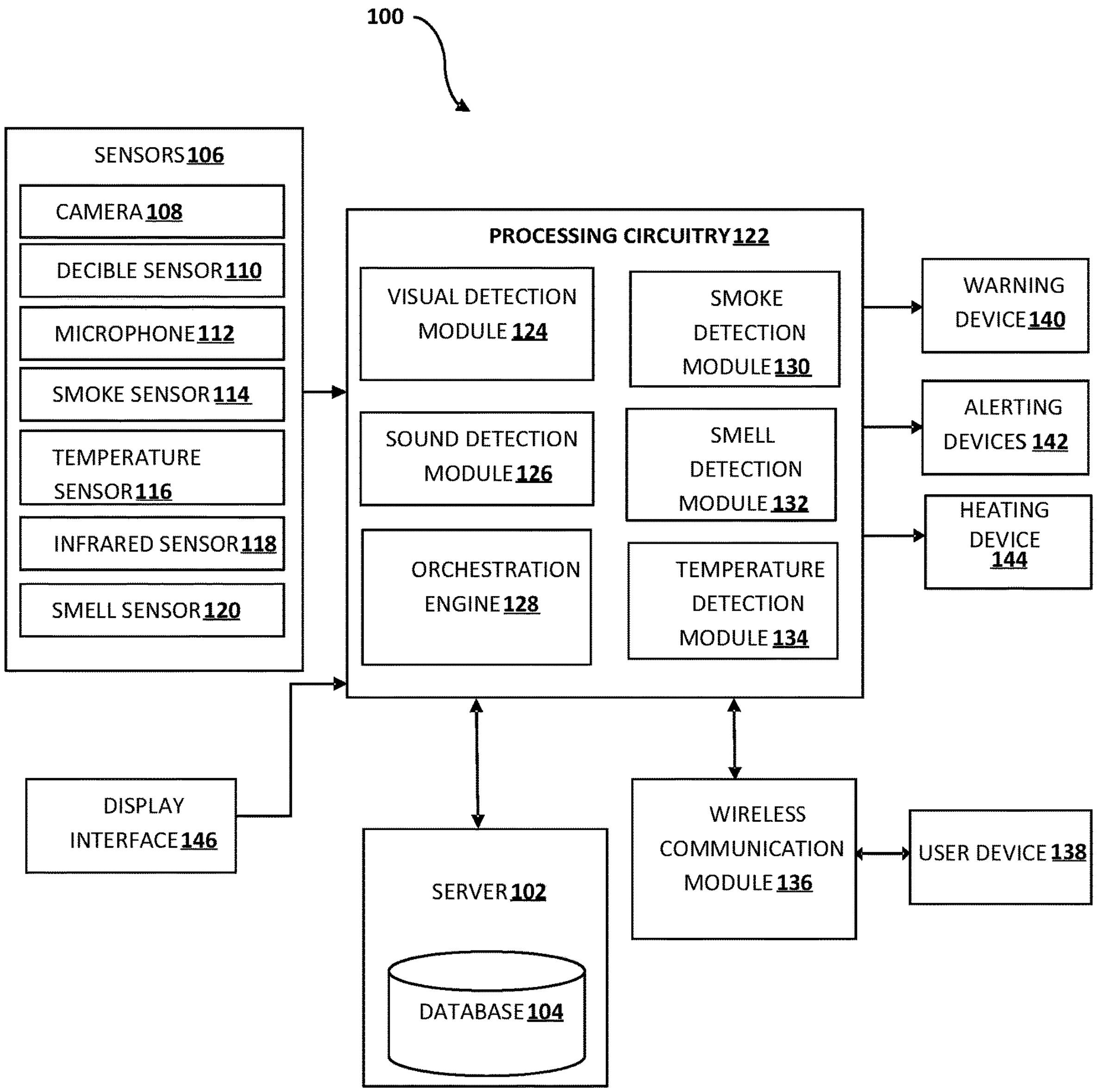
FIG. 1 is a block diagram of a system, according to an embodiment of the present disclosure.

Embodiments of the present disclosure will be described below with reference to the drawings. The same reference numerals are given to the same corresponding parts in the figures, and the description thereof will not be repeated. At least some of the embodiments described below may be arbitrarily combined.

FIG. 1 is a block diagram showing a configuration of a system 100 for controlling a heating device 130 by monitoring a cooking dish, according to an embodiment of the present disclosure.

Referring to FIG. 1, the system 100 is capable of being configured over or within the heating device 144 for alerting a user by determining the closeness of the cooking dish from being overcooked, burned, or spilled over. Further, the system 100 is configured to control the heating device 144 based on the closeness of the cooking dish from being overcooked, burned, or spilled over. The system 100 comprises a cloud-based server 102 having a database 104, one or more sensors 106, processing circuitry 122, a wireless communication module 138, a warning device 140, alerting devices 142, a heating device 144, and a display interface 146.

The one or more sensors 106 comprises a visual detection sensor such as a camera 108, one or more sound detection sensors such as a decibel sensor 110 and a microphone 112, a smoke detection sensor 114, a temperature detection sensor 116, an infrared sensor 118 and a smell sensor 120. The processing circuitry 122 further comprises a visual detection module 124, a sound detection module 126, an orchestration engine 128, a smoke detection module 130, a smell detection module 132, and a temperature detection module 134. The alerting devices 142 may include any of buzzer, speaker, alarm, or display screen.

The one or more sensors 106 are configured to monitor the heating device 106 and the cooking dish being cooked over or within the heating device 144. The heating device 144 may be any of a conventional gas stove, an oven, a microwave, or any other cooking device. The one or more sensors 106 are communicatively coupled with the processing circuitry 122 to transmit the sensory data. The sensory data comprises visuals corresponding to the heating device 144 and the cooking dish, sounds corresponding to the cooking dish, and a cooking utensil within which the cooking food is being prepared. The camera 108 is configured to collect the visuals corresponding to the heating device 144 and the cooking dish. The visuals include images and/or videos taken by the camera 108 of the cooking dish and the heating device 144. The decibel sensor 110 and the microphone 112 are configured to collect the sound corresponding to the cooking dish and the cooking utensil. The sound may be any of a sound of the sizzling, the sound of steam, and the sound of whistles of the cooking utensil. The microphone 112 is further configured to receive the audio command of the user.

Further, the sensory data comprises a smell corresponding to the cooking dish, a smoke and a temperature surrounding the heating device 144, and the temperature of the spread across the cooking dish. The smoke detection sensor 114 is configured to detect the smoke surrounding the heating device 114 and the cooking utensil. The smell detection sensor 120 is configured to detect the smell of the cooking dish. Further, the smell detection sensor 120 is configured to detect the smell of the cooking gas to detect a leakage of the cooking gas in some cases. The temperature detection sensor 116 is configured to detect the surrounding temperature of the heating device 144. Further, the infrared sensor 118 is configured to measure temperature distribution across the cooking dish being prepared.

The processing circuitry 122 of the system 100 is configured to receive the sensory data from the one or more sensors 106. The processing circuitry 122 using the received sensory data, may determine the level of closeness of the cooking dish from being completely and sufficiently cooked. Further, using the received sensory data, the processing circuitry 122 may determine the closeness of the cooking dish from being overcooked, burned, or spilled over. Further, the processing circuitry 122 may inform the user about the closeness of the cooking dish from being overcooked, burned, or spilled over by generating a warning signal. The warning signal may be an activation signal for the activation of the warning device 140. The warning device 140 may be LED lights of different colors corresponding to the severity of the warning signal. The warning signal may also be a message sent by the processing circuitry 122 over a user device 138 of the user. The user device 138 may be communicatively coupled with the processing circuitry 122 using the wireless communication module 136. The warning signal may also be displayed over the display interface 122 by the processing circuitry 122

Further, the processing circuitry 122 is configured to receive a user input from the user as an acknowledgment of reception and consideration of the warning signal. The user input may be a click or a tap by the user over the display interface 146. Further, the user input may be the input request by the user to turn off the LED lights. Further, the user input may be a voice command provided by the user as an acknowledgment of the warning signal. Further, the user input may be the control command received from the user device 138.

Further, the processing circuitry 112 is configured to activate the alerting devices 142 in case of not receiving the user input. The alerting devices 142 may include a buzzer, speaker, and alarm. Further, the alerting devices 142 include a display interface 146 that may be used by the processing circuitry 122 to alert the user.

Further, the processing circuitry 122 is configured to generate a signal to control the heating device 144 based on the determined closeness of the heating device 144 and the status of the alerting device 142. For instance, the processing circuitry 122 generates a signal to turn OFF the heating device 144 when determining whether the cooking dish is about to be overcooked, burned, or spilled over and when the alerting device 142 is ON.

In an embodiment, the processing circuitry 122 is configured to determine the readiness of the cooking dish using the visual data received from camera 108. The processing circuitry 122 receives the images and/or videos of the cooking dish from camera 108. Further, the processing circuitry 122 uses a reference data stored within the database 104 of the server 102. The reference data comprises a plurality of reference images of the cooking dishes stored within database 104. The processing circuitry 122 using the visual data and the reference data determine the readiness of the cooking dish.

Further, the processing circuitry 122 receives the detected sound from one or more sound detection sensors such as the decibel sensor 110 and the microphone 112. The processing circuitry 122 using the detected sound and the reference data stored within the database 104 of the server 102 determines the sound associated with the cooking dish. The reference data further comprises a plurality of reference sounds associated with the cooking dishes stored within server 102.

The processing circuitry 122 using the determined readiness and determining sound associated with the cooking dish, determines the closeness of the cooking dish from being overcooked, burned, or spilled over. The processing circuitry 122 comprises a machine learning algorithm to determine the readiness of the cooking dish and the sound associated with the cooking dish. Further, the processing circuitry 122 uses the machine learning algorithm to determine the closeness of the cooking dish from being overcooked, burned, or spilled over from the determining readiness and the determined sound.

Further, the processing circuitry 122 uses the smoke detection sensor 114 to detect the smoke surrounding the heating device 144 and determine the closeness of the cooking dish from being overcooked, burned, or spilled over.

Further, the processing circuitry 122 detects temperature spread across the cooking dish using the infrared sensor 128 and a smell associated with the cooking dish using the smell detection sensor 120. The processing circuitry further uses the detected temperature and smell associated with the cooking dish to determine the closeness of the cooking dish from being overcooked, burned, or spilled over.

Figure 2:
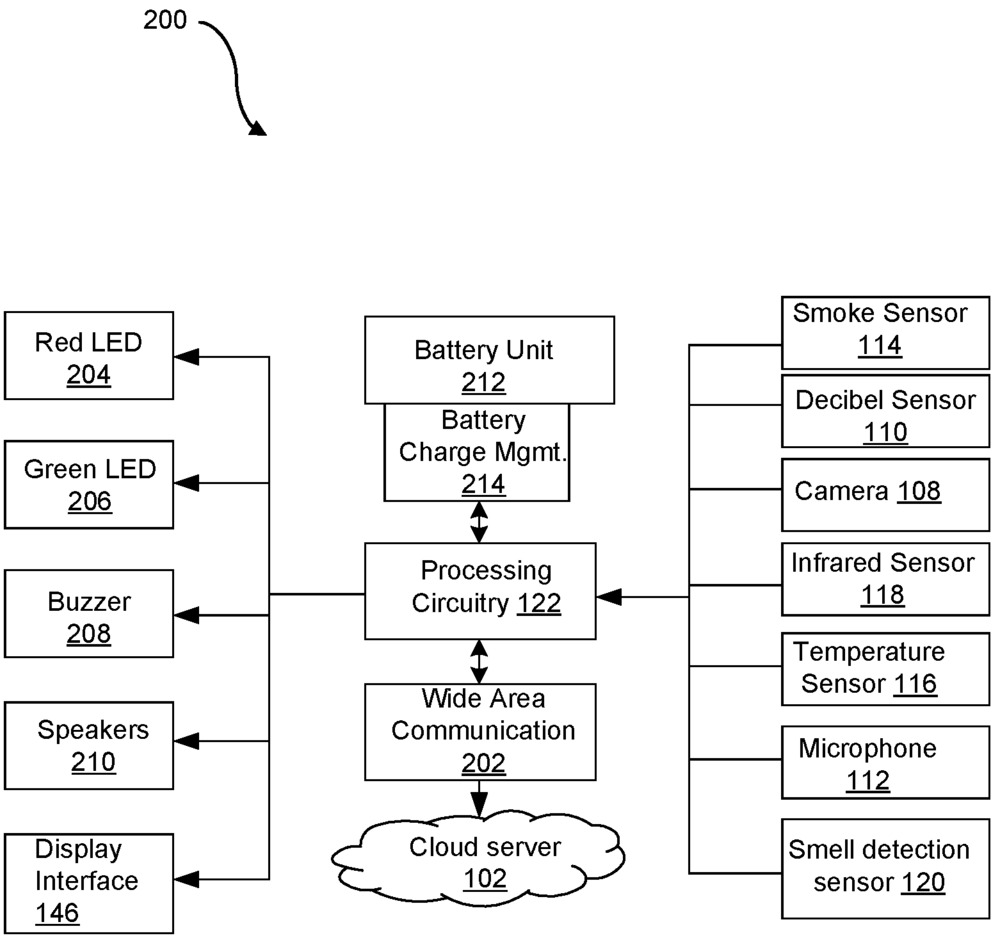
FIG. 2 is a block diagram of an input and output operation of the processing circuitry, according to an embodiment of the present disclosure.

FIG. 2 is a block diagram 200 of an input and output operation of the processing circuitry 122, according to an embodiment of the present disclosure.

Referring to FIG. 2, the processing circuitry 122 of the present system 100 is coupled with the cloud-based server 102 over a network through a wide area communication module 202. The wide area communication module 202 may be a cellular modem such as GSM or CDMA. The wide area communication module 202 may be a Wi-Fi module or an Ethernet to connect the processing circuitry 122 with the network to couple with the cloud server 102.

The system 100 further comprises different warning devices 142 and alerting devices 144 as an output device of the system 100. The warning device 142 comprises different colored LED lights. The warning device 142 comprises Red LED 204 and Green LED 206. The Red LED 204 is configured to be activated when the processing circuitry 122 generates a warning signal. The Green LED 206 is configured to be activated when the system 100 is working in a normal condition.

Further, the alerting devices 144 may comprise different alerting devices to instantly attract the attention of the user. For instance, system 100 comprises the buzzer 208, the speaker 210, and the display interface 146 as the alerting devices 144. In one embodiment, the alerting devices 144 are configured to alert the user when not received any user input by the processing circuitry 122 as an acknowledgment of a warning signal from the user.

The system 100 further comprises a battery unit 212. The battery unit 212 may be a rechargeable battery unit configured to provide power for the working of the electronic components of system 100. Further, the battery unit is coupled with the processing circuitry 122 through the battery charge management module 214. The battery charge management module 214 is configured to monitor and manage the level of charge in the battery unit 212. Further, the battery charge management module 214 is configured to generate an alert signal for the user when battery unit 212 drains below a predefined level.

In one embodiment, the system 1X) may further be used as a safety unit for detection and protection from leakage of cooking gas.

The system 100 comprises a smell detection sensor 120. The smell detection sensor 120 may be a cooking gas detection sensor that is coupled with the processing circuitry 122. The smell detection sensor 130 may be configured to detect the smell of the cooking gas surrounding the heating device 144. The processing circuitry 122 is configured to receive the data corresponding to the detected smell from the smell detection sensor 120 and determine the possibility of the leakage of the cooking gas.

Further, the processing circuitry 122 is configured to determine the possibility of leakage of the cooking gas and generate an alert signal to activate the alerting devices 142 of the system 100. Further, the processing circuitry 122 is configured to control the heating device 144 to shut off the supply of cooking gas.

Figure 3:
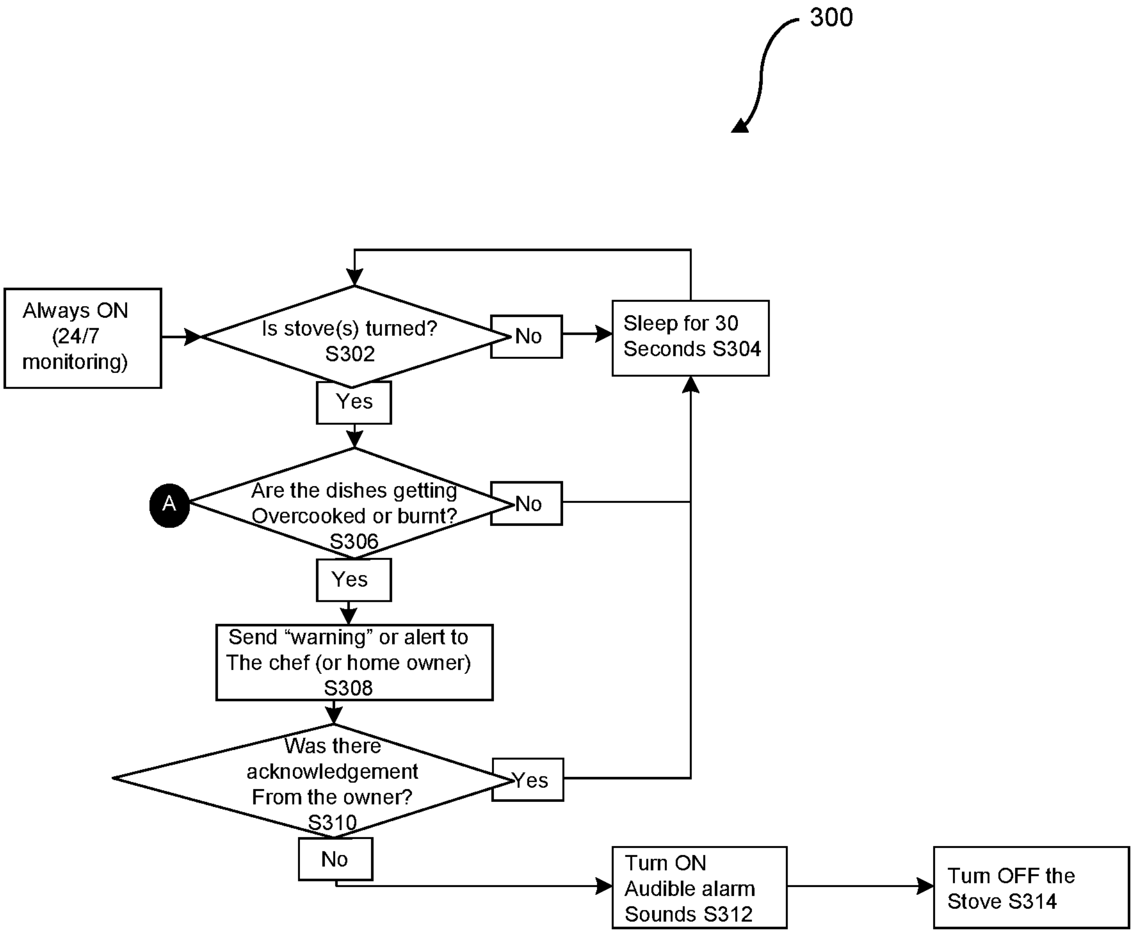
FIG. 3 is a flowchart of a method for monitoring a cooking dish and controlling a cooking device, according to an embodiment of the present disclosure.

FIG. 3 is a flowchart of a method for monitoring a cooking dish and controlling a cooking device, according to an embodiment of the present disclosure.

Referring to FIG. 3, the processing circuitry 122 determines the status of the heating device 144 using one or more sensors 106, at step S302. In one case, if the heating device 144 is determined to be turned OFF, then the processing circuitry 122 goes into a sleeping mode for a certain amount of time, at step S304. For example, if the processing circuitry 122 determines the heating device 144 to be off then the processing circuitry shifts to sleep mode for 30 seconds.

In another case, if the heating device 144 is determined to be turned ON, then the method may proceed to step S306, to determine if the cooking dish is getting overcooked, burned, or spilled over. For example, the processing circuitry 122 using the sensory data received from one or more sensors 106, determines the readiness of the cooking dish, the sound associated with the cooking dish, and the smoke associated with the fishing dish. Using the determined readiness, sound, and smoke, the processing circuitry 122 determines the closeness of the cooking dish from being overcooked, burned, or spilled over.

Further, the warning signal is generated by the processing circuitry 122 to activate the alerting devices 142, at step S308. For example, the processing circuitry 122 turns on the warning device 140. Also, the processing circuitry 122 sends a warning message to the user device 138 of the user.

Further, the method proceeds to check if there is a user input received from the user as an acknowledgment of the warning signal, at step S310. In one case, if the processing circuitry 122 detects the user input from the user, then the method proceeds to step S302 and shifts the processing circuitry 122 into sleeping mode.

In another case, if the processing circuitry 122 does not detect any user input from the user, then the method proceeds to step S312 to activate the alerting devices 142. For example, the processing circuitry 122 activates the buzzer 208 or the speaker 210.

Successively, the processing circuitry 122 controls or turns off the heating device 144, at step S314.

Figure 4:
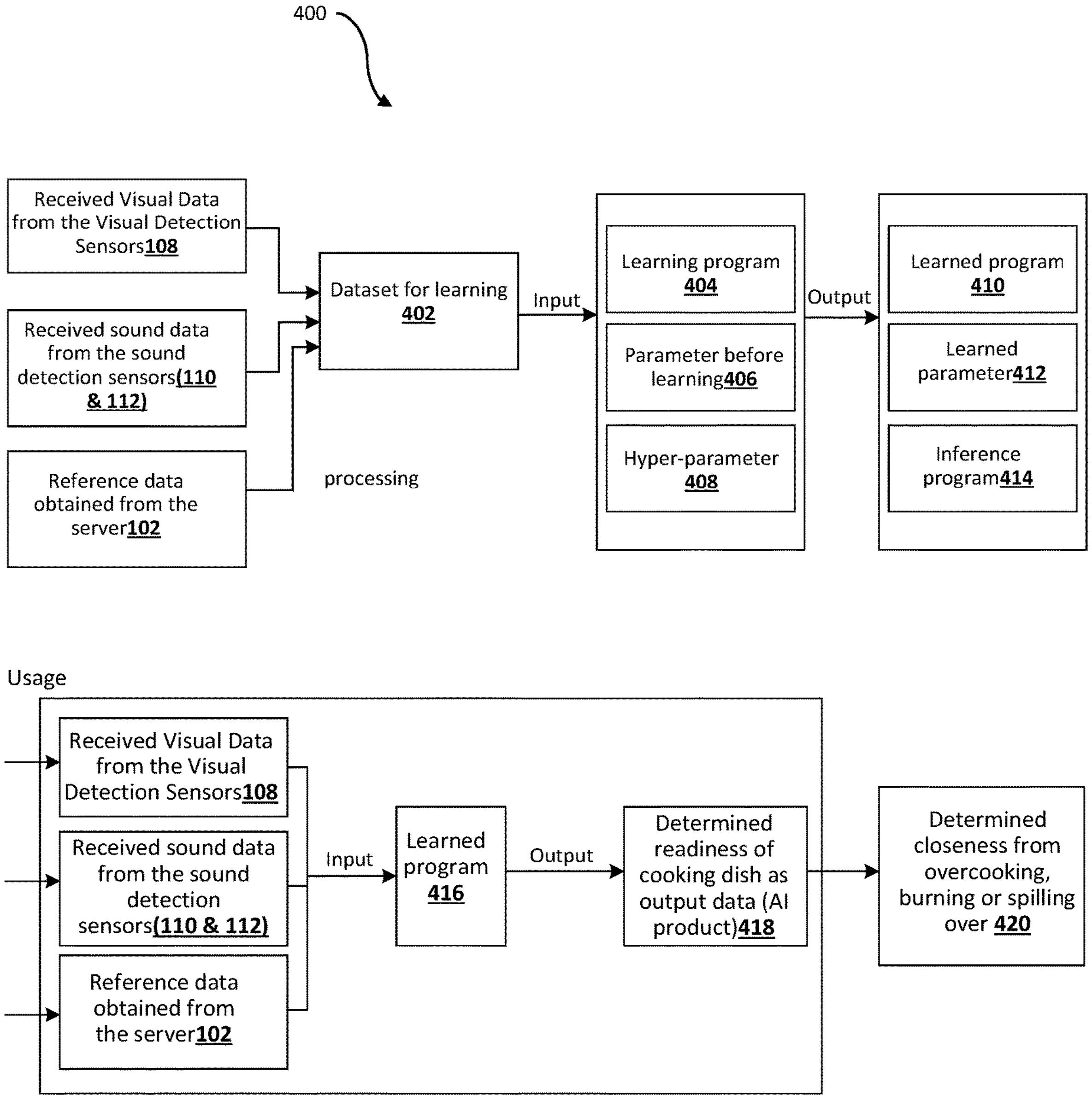
FIG. 4 is a block diagram of a machine learning assembly, according to an embodiment of the present disclosure.

FIG. 4 is a block diagram 400 of a machine learning assembly 400, according to an embodiment of the present disclosure.

The machine learning assembly 400 may be configured to train a neural network for readiness output data by using actual values of the input data as training data and configured to input the input data to the neural network by the machine learning assembly 400 as a reference.

The readiness of the cooking dish is calculated based at least on the received visual data, received sound data, and the reference data and output the closeness of the cooking dish from being overcooked, burned, or spilled over. The machine learning assembly 400 may comprise a learning process. The learning process comprises the visual detection sensor 108 configured to input the visual data, the audio detection sensors (110 & 112) configured to input the audio data, and server 102 configured to input the reference data. The visual data, the audio data, and the reference data may transmit to dataset 402 for learning.

Further, the dataset for learning 402 may be communicably coupled to a learning program 404 for the transmission of input data. The learning program 404 provides a trainer/assessor with information about the competencies and suggestions for an assessment strategy. The learning program 404 may be supervised or unsupervised. The learning program 404 is configured to process the output data to a parameter before learning 406. The parameter before learning 406 is a configuration variable internal to a model and whose value may be estimated from data received from the learning program 404. The parameter before learning 406 is configured to transmit the output data to a hyper-parameter 408. The hyper-parameter 408 is configured to process parameters to the model for the value that may not be estimated from data and send output to a learned program 410 of the learning process.

The learned program 410 may be supervised or unsupervised. Further, the learned program 410 is configured to transmit the output data to a learned parameter 412. The learned parameter 412 provides the trained information about the competencies and suggestions for the assessment strategy. The learned parameter 412 is a configuration variable internal to the model and whose value may be estimated from data received from the learned program 410. The learned parameter 412 is configured to transmit live data points into an interference program 414 to calculate the learned output data.

Further, the machine learning assembly 400 comprises a usage process. The usage process comprises the visual detection sensor 108 configured to input the visual data, the audio detection sensors (110 & 112) configured to input the audio data, and server 102 configured to input the reference data. The visual data, the audio data, and the reference data may transmit to a learned program 416 of the usage process. The learned program 416 of the usage process is configured to determine the readiness of the cooking dish as an output 418. Thus, the machine learning assembly 400 is configured to determine the closeness of the cooking dish from being overcooked, burned, or spilled over 420.

Figure 5A:
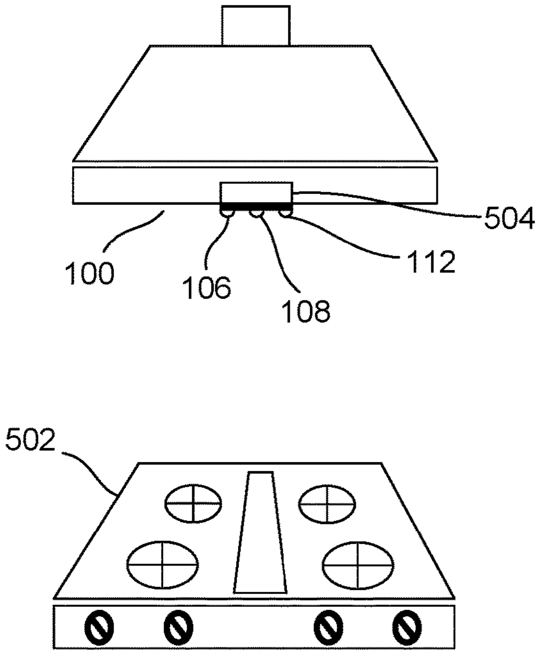
FIG. 5A is an image showing an exemplary embodiment of the system configured over a conventional stovetop in a typical kitchen, according to an embodiment of the present disclosure.
Figure 5B:
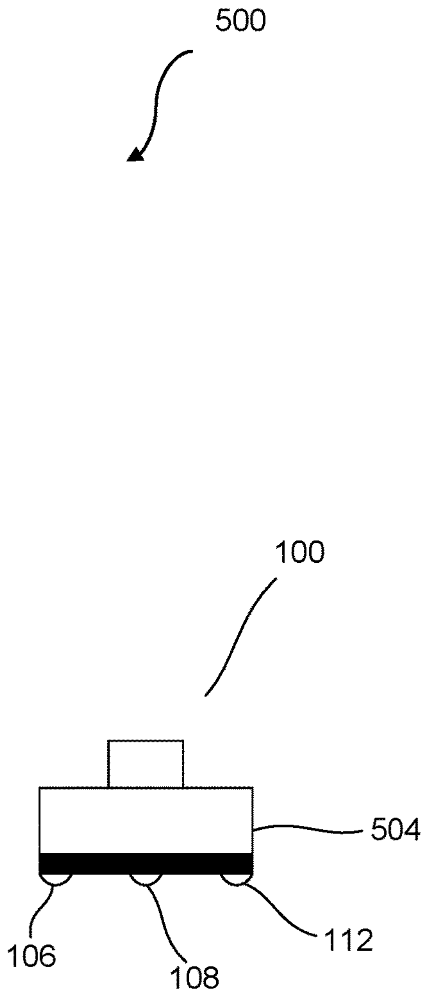
FIG. 5B is an image showing a zoomed-in image of the same exemplary embodiment of the system 100 as disclosed in the FIG. 5A, according to an embodiment of the present disclosure.

FIG. 5*a* is image 500 showing an exemplary embodiment of system 100 configured over a conventional stovetop in a typical kitchen, according to an embodiment of the present disclosure. FIG. 5*b* is an image showing a zoomed-in image of the same exemplary embodiment of system 100 as disclosed in FIG. 5*a*, according to an embodiment of the present disclosure.

Referring to FIG. 5*a*, system 100 is capable of being installed over any of the conventional heating devices 144. For instance, system 100 is installed over the conventional gas stovetop 502. The system 100 is configured to monitor both the stovetop 502 and the cooking dish being prepared over the stovetop 502 to determine the closeness of the cooking dish from being overcooked, burned, or spilled over. The system 100 is further configured to control the operations of stovetop 502.

The system 100 may comprise a plurality of sensors 106 configured within the housing 504 of system 100. The plurality of sensors 106 may include the visual detection sensor such as the camera 108, the sound detection sensors such as the microphone 112, and the smoke detection sensor 114 as shown in FIG. 5*b*. The plurality of sensors 106 are configured to detect the visuals of the stovetop 502 and the cooking dish, the sound associated with the cooking dish, and the smoke surrounding the cooking dish to determine the closeness of the cooking dish from being overcooked, burned, or spilled over.

Figure 6:
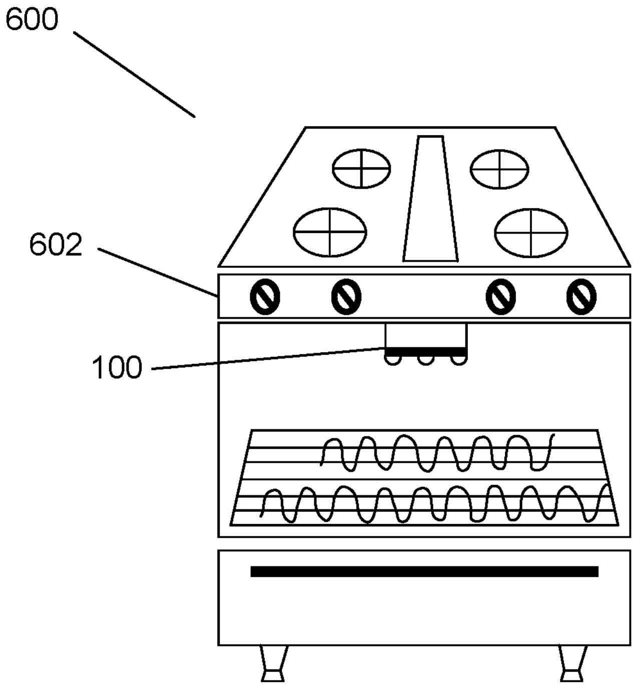
FIG. 6 is an image showing an embodiment of the FIG. 5B of the system mounted in a conventional oven, according to an embodiment of the present disclosure.
Figure 7:
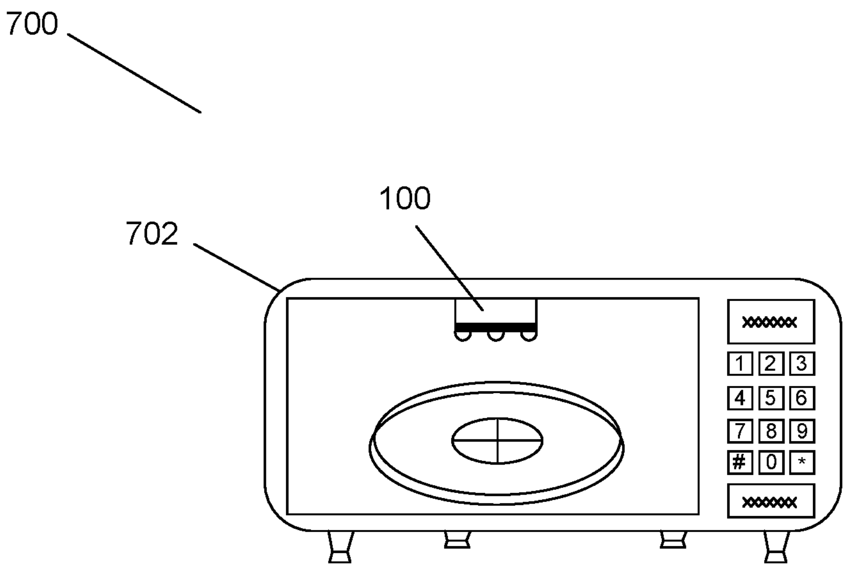
FIG. 7 is an image showing an embodiment of the FIG. 5B of the system mounted in a conventional microwave oven, according to an embodiment of the present disclosure.

FIG. 6 is an image 600 showing an embodiment of FIG. 5B of the system 100 mounted in a conventional oven 602, according to an embodiment of the present disclosure. FIG. 7 is an image 700 showing an embodiment of the FIG. 5B of the system 100 mounted in a conventional microwave oven 702, according to an embodiment of the present disclosure.

Referring to FIG. 6, the system 100 for controlling the heating device by monitoring the cooking dish is mounted within the conventional oven 602. The system 100 may be mounted inside the conventional oven 602 over a top surface to monitor the cooking dish placed inside the oven 602. Similarly, the system 100 configured inside the microwave oven 702 is disclosed in FIG. 7.

The above embodiments are exemplary in all respect and are not restrictive. The scope of the invention is set forth in the claims, not in the above description, and includes the meaning of and all variations within the scope of the claims.

Terminology

It is to be understood that not necessarily all objects or advantages may be achieved in accordance with any particular embodiment described herein. Thus, for example, those skilled in the art will recognize that certain embodiments may be configured to operate in a matter that achieves or optimizes one advantage or group of advantages as taught herein without necessarily achieving other objects or advantages as may be taught or suggested herein.

All of the processes described herein may be embodiment in and fully automated via, a software code module executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiments, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, multiple processors or processor cores, or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, state machine, a combination of the same, or the like. A processor can include electrical circuitry configured to process computer-executable instructions. In another embodiment, a processor includes an application-specific integrated circuit (ASIC), a field programmable gate array (FPGA) or another programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computed system, including, but not limited to, a computer system based on a microprocessor, a mainframe computer, a digital signal processor, a portable computing device, a device controller, or a computational engine within an appliance, to name a few.

Conditional language such as, among others, "can", "could", "might" or "may", unless specifically stated otherwise, are otherwise understood within the context as used in general to convey those certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without user input or prompting, whether these features, elements and/or steps are included or are to be performed in any embodiment.

Disjunctive language such as the phrase "at least one of X, Y, or Z," unless specifically states otherwise, is otherwise understood with the context as used in general to present that an item, term, etc., may be either X, Y. or Z, or any combination thereof (e.g., C, Y, and/or Z). Thus, such disjunctive language is not generally intended to, and should not, imply that certain embodiments require at least one of X, at least one of Y, or at least one of Z to each be present.

Any process description, elements, or blocks in the flow diagram described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as “a” or “an” should generally be interpreted to include one or more described items. Accordingly, phrases such as “a device configured to” are intended to include one or more recited devices. Such one or more recited devices can also be collectively configured to carry out the stated recitations. For example, “a processor configured to carry out recitations A. B, and C” can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of “two recitations,” without other modifiers, typically means at least two recitations or two or more recitations).

It will be understood by those within the art that, in general, terms used herein, are generally intended as “open” terms (e.g., the term “including” should be interpreted as “including but not limited to,” the term “having” should be interpreted as “having at least,” the term “includes” should be interpreted as “includes but is not limited to.” etc.).

For expository purposes, the term “horizontal” as used herein is defined as a plane parallel to the plane or surface of the floor of the area in which the system being described is used or the method being described is performed, regardless of its orientation. The term “floor” can be interchanged with the term “ground” or “water surface”. The term “vertical” refers to a direction perpendicular to the horizontal as just defined. Terms such as “above,” “below,” “bottom,” “top,” “side,” “higher,” “lower,” “upper,” “over,” and “under,” are defined with respect to the horizontal plane.

As used herein, the terms “attached.” “connected.” “mated.” and other such relational terms should be construed, unless otherwise noted, to include removable, movable, fixed, adjustable, and/or releasable connections or attachments. The connections/attachments can include direct connections and/or connections having an intermediate structure between the two components discussed.

Unless otherwise explicitly stated, numbers preceded by a term such as “approximately”, “about”, and “substantially” as used herein include the recited numbers and also represent an amount close to the stated amount that still performs a desired function or achieves a desired result. For example, unless otherwise explicitly stated, the terms “approximately”, “about”, and “substantially” may refer to an amount that is within less than 10% of the stated amount. Features of embodiments disclosed herein preceded by a term such as “approximately”, “about”, and “substantially” as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A system for controlling a heating device by monitoring a cooking dish, comprising:

a cloud server comprising a reference data;

one or more sensors configured to monitor the cooking dish and the heating device; and a processing circuitry communicatively coupled with the cloud server and the one or more sensors, the processing circuitry is configured to receive a sensory data from the one or more sensors;

determine the closeness of the cooking dish from being overcooked, burned, or spilled over using the received sensory data; and generate a warning signal for a user based on the determined closeness of the cooking dish from being overcooked, burned, or spilled over;

wherein the processing circuitry is further configured to receive the sensory data from the one or more sensors;

determine the presence of a smell of a cooking gas surrounding the heating device from the received sensory data;

detect leakage of the cooking gas; and generate a warning signal and activate the alerting device to alert the user of the cooking gas leakage.

2. The system of claim 1, wherein the warning signal for the user is a notification or a message sent on a user device or an activation signal for a warning device.

3. The system of claim 1, wherein the processing circuitry is further configured to receive a user input corresponding to the acknowledgment of the warning signal from the user; or activate an alerting device to alert the user when not received the user input.

4. The system of claim 3, wherein the processing circuitry is further configured to determine the closeness of the cooking dish from being cooked, overcooked, burned, or spilled over;

activate the alerting device based on the determined closeness; and generate a signal to control the heating device based on the determined closeness and a status of the alerting device.

5. The system of claim 4, wherein the alerting device is any of a buzzer, speaker, alarm, or display interface.

6. The system of claim 5, wherein the display interface is a touch display further configured to receive the user input and a control command from the user.

7. The system of claim 1, further comprises a wireless communication module to connect with a user device to send a warning signal to the user device; and receive the user input and control command from the user.

8. The system of claim 1, wherein the one or more sensors comprises a visual detection sensor and one or more sound detection sensors.

9. The system of claim 8, wherein the one or more sensors further comprises a smell detection sensor, a smoke detection sensor, a temperature detection sensor, and an infrared sensor.

10. The system of claim 8, wherein the processing circuitry is further configured to detect visuals using the visual detection sensor to determine a readiness of the cooking dish;

detect sound associated with the cooking dish using the one or more sound detection sensors; and determine the closeness based on the detected visuals and the detected sound.

11. The system of claim 10, wherein the processing circuitry further comprises a machine learning algorithm that configures the processing circuitry to receive one or more images of the cooking dish and the heating device from the visual detection sensor as the sensory data;

obtain the reference data including a plurality of reference images stored within the cloud server; and determine the readiness of the cooking dish.

12. The system of claim 10, wherein the sound associated with the cooking dish comprises sounds of sizzling, steaming, and whistles of cooking utensils.

13. The system of claim 12, wherein the processing circuitry further comprises a machine learning algorithm that configures the processing circuitry to receive sound from the one or more sound detection sensors;

obtain the reference data including a plurality of reference sounds stored within the cloud server; and determine the sound associated with the cooking dish.

14. The system of claim 13, wherein the processing circuitry is further configured to determine the closeness of the cooking dish from being cooked, overcooked, burned or spilled over and generate a warning signal for the user based on the determined closeness, having a neural network having the visual data received from the visual detection sensor, the received sound data received from the sound detection sensors, and the reference data obtained from the cloud server as an input data, and a result of a determined readiness as a readiness output data; and a machine learning assembly configured to train the neural network for the output data by using the input data as a training data, and configured to:

enter the input data to the neural network learned by the machine learning assembly as a reference;

determine the readiness of the cooking dish; and determine the closeness of the cooking dish from being overcooked, burned, or spilled over.

15. The system of claim 1, wherein the processing circuitry is further configured to detect temperature, smoke, and the infrared associated with the cooking dish from the received sensory data; and determine the closeness of the cooking from being overcooked, burned, or spilled over.

16. The system of claim 1, wherein the processing circuitry is further configured to detect a user input as a voice from the user using the one or more sound detection sensors;

convert the received user input from the voice to text; and process the text to determine the message or comment related to the readiness of the cooking dish from the user.

* * * * *